US005221730A

United States Patent [19]
Morris et al.

[11] Patent Number: 5,221,730
[45] Date of Patent: Jun. 22, 1993

[54] POLYESTERS FROM TEREPHTHALIC ACID, 2,6-NAPHTHALENEDICARBOXYLIC ACID AND HYDROQUINONE

[75] Inventors: John C. Morris; Winston J. Jackson, Jr., both of Kingsport; James R. Bradley, Johnson City, all of Tenn.

[73] Assignee: Eastman Kodak Company, Rochester, N.Y.

[21] Appl. No.: 614,320

[22] Filed: Nov. 16, 1990

[51] Int. Cl.$^5$ .................. C08G 63/02; C08G 63/18; C08G 63/00; C08J 67/00

[52] U.S. Cl. .................................. 528/194; 524/599; 524/601; 524/605; 524/449; 524/451; 524/341; 524/411; 528/176; 528/190; 528/193; 528/272; 528/437; 528/444; 528/421; 528/422; 528/127; 528/174; 528/192; 525/425; 525/392; 525/397; 525/132; 525/447; 525/448; 525/414

[58] Field of Search ............... 528/176, 190, 193, 194, 528/272, 437, 444; 524/599, 601, 605

[56] References Cited

U.S. PATENT DOCUMENTS

| | | | |
|---|---|---|---|
| 3,030,335 | 4/1962 | Goldberg | 528/272 |
| 3,036,990 | 5/1962 | Kantor et al. | 528/272 |
| 3,160,604 | 12/1964 | Holub et al. | 528/272 |
| 3,637,595 | 1/1972 | Cottis et al. | 528/272 |
| 4,146,702 | 3/1979 | Morris et al. | 528/191 |
| 4,156,070 | 5/1979 | Jackson, Jr. et al. | 528/191 |
| 4,169,933 | 10/1979 | Jackson, Jr. et al. | 528/190 |
| 4,181,792 | 1/1980 | Jackson, Jr. et al. | 528/190 |
| 4,184,996 | 1/1980 | Calundann | 528/190 |
| 4,201,856 | 5/1980 | Jackson, Jr. et al. | 528/190 |
| 5,025,082 | 6/1991 | Kishiro et al. | 528/190 |

FOREIGN PATENT DOCUMENTS

| | | |
|---|---|---|
| 0058403 | 8/1982 | European Pat. Off. . |
| 7901040 | 11/1979 | PCT Int'l Appl. . |
| 7900797 | 10/1990 | PCT Int'l Appl. . |

OTHER PUBLICATIONS

M. Vesely Und Z. Zamorsky.
V. V. Korshak and S. V. Vinogradova Polyesters, 1965, Pergamon Press, Oxford.

Primary Examiner—John Kight, III
Assistant Examiner—T. Mosley
Attorney, Agent, or Firm—Mark A. Montgomery; William P. Heath, Jr.

[57] ABSTRACT

Disclosed are melt-processable wholly aromatic polyesters prepared from terephthalic acid, 2,6-naphthalenedicarboxylic acid, and hydroquinone.

17 Claims, No Drawings

POLYESTERS FROM TEREPHTHALIC ACID, 2,6-NAPHTHALENEDICARBOXYLIC ACID AND HYDROQUINONE

FIELD OF THE INVENTION

The present invention relates to the preparation of high molecular weight melt-processable aromatic polyesters based on terephthalic acid, 2,6-naphthalenedicarboxylic acid, and hydroquinone that have excellent physical properties. The present invention more particularly relates to melt processable, thermotropic liquid crystalline wholly aromatic polyesters based on unsubstituted terephthalic acid, 2,6-naphthalenedicarboxylic acid, and hydroquinone.

BACKGROUND OF THE INVENTION

Liquid crystalline polyesters prepared from many different monomers are disclosed in the prior art. U.S. Pat. No. 3,036,990 discloses fully aromatic polyesters prepared from hydroquinone, isophthalic acid, and terephthalic acid. U.S. Pat. No. 4,169,933 discloses liquid crystal copolyesters prepared from terephthalic acid, 2,6-naphthalenedicarboxylic acid, a diacyl ester of hydroquinone and p-acyloxybenzoic acid and contains certain divalent radicals.

Prior to the present invention melt-processable all-aromatic liquid crystalline polyesters required either a hydroxy acid (unsymmetrical by nature because the two reactive groups are different), a substituted aromatic dicarboxylic acid or diol, or a kinking component, e.g., isophthalic acid or oxydibenzoic acid, in order to lower high melting points.

The solution to the problem of highly aromatic liquid crystal polyesters having a melting point so high that the polyester could not be melt processed in conventional equipment was to lower the melting point to an acceptable level by either using a substituted aromatic diol or dicarboxylic acid such as phenyl-, bromo- or chlorohydroquinone, or chloroterephthalic acid; a kinked structure such as a isopropylidene, sulfone, or keto linkage between the aromatic rings; or a meta directed or substituted aromatic dicarboxylic acid or diol, such as isophthalic acid or resorcinol; and/or a hydroxy acid monomer, such as p-hydroxybenzoic acid or 2-hydroxy-6-naphthoic acid. While these approaches were effective in lowering the melting point of the polymer, there was also a reduction in solvent resistance. Additionally, the polymers of the prior art containing the types of structures described above have much reduced heat resistance (heat deflection temperature) due to the presence of the substituents or the kinks or the hydroxy acid components.

In light of the above it would be very beneficial to be able to produce wholly aromatic melt-processable liquid crystal polyesters having the desirable combination of solvent resistance, exceptional oxidative stability and very high heat resistance.

SUMMARY OF THE INVENTION

The melt-processable wholly aromatic polyesters of the present invention are prepared from symmetrical, unsubstituted terephthalic acid, 2,6-naphthalenedicarboxylic acid, and hydroquinone.

The wholly aromatic unsubstituted polyesters of the present invention comprise:

(A) an acid component comprising repeating units of about 35 to 60 mol percent of terephthalic acid and about 65 to 40 mol percent 2,6-naphthalenedicarboxylic acid, and (B) an aromatic diol component comprising repeating units of at least 90 mol percent hydroquinone wherein the total mol percent of acid component and aromatic diol component are each 100 mol percent; said polyester being insoluble in pentafluorophenol and having a melting point below about 450° C.

DETAILED DESCRIPTION OF THE INVENTION

The wholly aromatic polyesters of the present invention are melt-processable but yet have exceptional thermal stability, high tensile and flexural strength, superior solvent resistance, and extraordinary heat resistance. The melt-processable wholly aromatic polyesters of the present invention avoid the need for a substituted, kinked, meta-directed or hydroxyacid component structure of the melt-processable wholly aromatic polyesters of the prior art. We have found a narrow range of thermotropic melt processable polyesters based on terephthalic acid, 2,6-naphthalenedicarboxylic acid, and hydroquinone which can be prepared in the melt.

By unsubstituted it is meant that there are no alkyl, aryl, or halogen substituents on the aromatic rings of the aromatic dicarboxylic acids or the aromatic diol. The reaction conditions for melt polymerization of the polyesters of the present invention are preferably in the range of 200°-400° C., more preferably in the range of 300°-400° C. A combination of processes may also be used to synthesize the polyesters of the present invention such as solid state polymerization of low molecular weight prepolymer prepared in the melt.

The polyesters of the present invention generally comprise between about 35 and 60 mol percent terephthalic acid units, 65-40 mol percent 2,6-naphthalenedicarboxylic acid units and at least about 90 mol percent hydroquinone units. Polyesters containing less than about 35 mol % terephthalic acid units or more than 60 mol % terephthalic acid units have melting points which make the polymers difficult to process without excessive thermal decomposition in the melt. The polyesters of the present invention more preferably comprise about 40 to 50 mol percent terephthalic acid, 60 to 50 mol percent 2,6-naphthalenedicarboxylic acid, and about 100 mol percent hydroquinone units.

The polyesters of the present invention are insoluble in pentafluorophenol, which is reported to be one of the few solvents known to dissolve all-aromatic unsubstituted liquid crystalline polyesters (see U.S. Pat. No. 4,184,996, 9 lines 28-38). Molded bars of the wholly aromatic polyester of the present invention are also unaffected after exposure for 24 hours in a variety of solvents which include toluene, 1,2-dichloroethane, methyl isobutyl ketone, ethyl acetate, ethanol, water, sulfuric acid, 10% sodium hydroxide, gasoline, acetone, acetic acid, 5% chlorox bleach, 50/50 water/ethanol, benzyl alcohol, nitric acid and methylene chloride.

The polyesters of the present invention have a melting point below about 450° C. However, it is preferred that these polyesters have a melting point below about 400° C.

The polyesters of this invention are prepared from terephthalic acid, 2,6-naphthalenedicarboxylic acid and preferably an acyl ester of hydroquinone. Examples of suitable acyl esters include the diacetate, dipropionate, dibenzoate and the like.

The dicarboxylic acid portion of these polyesters may be substituted with up to 20 mol %, but preferably, less than 10 mol % of other aromatic dicarboxylic acids. Examples of suitable aromatic dicarboxylic acids include isophthalic, 4,4'-biphenyldicarboxylic, 1,5-, 2,6-, 2,7-naphthalenedicarboxylic, 4,4'-oxydibenzoic acid or trans-4,4'-stilbenedicarboxylic acids.

The aromatic diol portion of these polymers may contain up to 10 mol %, but preferably less than 5 mol % of another aromatic diol. Examples of suitable aromatic diols include bisphenol A, 4,4'-dihydroxydiphenylsulfone, 2-methylhydroquinone, 2-chlorohydroquinone, 2-(phenylethyl)hydroquinone, 2-phenylhydroquinone, 2-cyclohexylhydroquinone and 4,4'-biphenol as well as the dihydroxy compounds which are disclosed in U.S. Pat. Nos. 3,030,335 and 3,317,466. It is preferred that all monomers used in the polyesters of the present invention be completely unsubstituted monomers.

The composition of the present invention also preferably comprises:

(i) about 5 to 95 wt. % of the wholly aromatic polyester, more preferably about 10 to 90 wt. % and
(ii) about 95 to 5 wt. % of at least one property modifier more preferably about 90 to 10 wt. %.

The property modifiers of (ii) include for example: 6,6-nylon, nylon-6, poly(ether-imides) such as ULTEM from General Electric, polyphenylene oxides such as poly(2,6-dimethyl-phenylene oxide), polyphenylene oxide/polystyrene blends such as the NORYL resins from General Electric, a different polyester, polyphenylene sulfides, polyphenylene sulfide/sulfone blends, poly(ester-carbonates), polycarbonates such as LEXAN from General Electric, polysulfones, polysulfone ethers, poly(ether-ketones), phosphorus compounds, halogen compounds, halogen compounds in combination with an antimony compound, talc, mica, glass fibers, or carbon fibers.

In addition to melt preparation, the polyesters of the present invention can be prepared by the following process:

(a) mixing, under polymerization conditions
  (A) an acid component comprising about 35 to 60 mol percent terephthalic acid and 65 to 40 mol percent 2,6-naphthalenedicarboxylic acid, and
  (B) an aromatic diol component comprising at least 90 mol percent hydroquinone
thereby producing a polyester, said polyester being insoluble in pentafluorophenol and having a melting point below about 450° C.,
wherein the total mol percent of acid component and aromatic diol component are each 100 mol percent;
(b) grinding or pelletizing the polyester;
(c) heating the particulate polyester of (b) under partial vacuum or nitrogen purge to further remove the reaction by-products to further increase the molecular weight of the polyester.

Steps (a) and (c) are preferably conducted at about 200° to 400° C., more preferably at about 300° to 400° C. with about 340° to 380° C. being most preferred.

It is preferred that the wholly aromatic polyester of the present invention is in the form of a molded object such as a container or part or an extruded object such as a fiber or film.

EXAMPLES

The following examples are to illustrate the present invention but should not be interpreted as limitation thereon.

The melting points of the copolymers are determined using a Perkin-Elmer DSC 2B Differential Scanning Calorimeter at a scan rate of 20° C./min. The melting points were also confirmed using a Fischer-Johns melting point apparatus. The acid content of the compositions is determined by basic alcoholic hydrolysis of the polymers and subsequent analysis by proton nuclear magnetic resonance spectroscopy (NMR) and by gas chromatography analysis of the hydrolyzed product.

The polymers are dried at 80°-100° C. in a vacuum oven for 24 hours, and injection-molded on a Boy 22S molding machine or a 1-ounce Watson-Stillman molding machine to give 1/16-inch thick D1822 Type L tensile bars and $\frac{1}{8} \times \frac{1}{2} \times 5$-inch flexure bars. The tensile strength is determined following the procedure of ASTM D638.

EXAMPLE 1

The following illustrates the preparation of a homopolyester containing 40 mol % terephthalic acid, 60 mol % 2,6-naphthalenedicarboxylic acid, and 100 mol % hydroquinone units.

A mixture of 39.8 g (0.24 mol) terephthalic acid, 77.8 g (0.36 mol) 2,6-naphthalenedicarboxylic acid, and 166.5 g (0.75 mol) hydroquinone dipropionate (25 mol % excess) was placed in a 1-L flask equipped with an inlet for nitrogen, a metal stirrer, and a short distillation column. The flask was then placed in a Wood's metal bath already heated to 300° C. and the contents of the flask were heated at 300° C. for about 20 minutes. The temperature was then raised progressively to 310° C., 330° C., 375° C., and then on to 400°-415° C. over the next 50 minutes. A vacuum of 0.5 mm was gradually applied over the next 3-5 minutes. Full vacuum was maintained for about 20 minutes. A high melt viscosity, opaque, tan, crystalline polymer was obtained with melting endotherms measured by DSC at 374° C. and 392° C.

The polymer was ground to pass a ¼-inch screen, dried and injection-molded to give bars having a tensile strength of 24,000 psi and a heat deflection temperature of 306° C. at 264 psi stress.

The remaining polyesters in the table below were prepared and injection-molded in a manner essentially identical to the above.

TABLE 1

Properties of T(NA)(HQ)[a] Polyesters

| T Content, mol % | NA Content, mol % | Melting Endotherms Temp., °C. | Barrell Molding Temp., °C. | Tensile Str., psi | Heat Deflection Temp., °C.[b] |
|---|---|---|---|---|---|
| 100 | 0 | 574,602 | — | — | — |
| 80 | 20 | 410,425 | — | — | — |
| 55 | 45 | 402 | — | — | — |
| 50 | 50 | 379,396 | — | — | — |
| 45 | 55 | 378,393 | — | — | — |
| 40[c] | 60 | 374,392 | 410 | 24,000 | 306(357) |
| 40[c] | 60 | 372,388 | 390 | 21,000 | 308(355)[d] |
| 40 | 60 | 382,391 | — | — | — |
| 35 | 65 | 411 | — | — | — |
| 20 | 80 | 420,507 | — | — | — |
| 0 | 100 | 583 | — | — | — |

[a] T = terephthalic acid, NA = 2,6-naphthalenedicarboxylic acid, HQ = hydroquinone
[b] Heat deflection temperature is determined at 264 psi stress. Heat deflection temperature at 66 psi stress is shown in parentheses.
[c] These polymers are injection-molded on a Boy 22s screw-type injection molding machine into a 23° C. mold.
[d] This polymer is molded into a 150° C. mold.

The above table illustrates that polyesters prepared according to the present invention have a sufficiently low melting endotherm to be melt processable. Injection-molded bars of the polyesters of the 40/60 T/NA mol ratio have excellent properties and are representative of the polyesters of the present invention.

We claim:

1. A wholly aromatic unsubstituted polyester comprising:
   (A) an acid component comprising repeating units of about 35 to 60 mol percent of terephthalic acid and about 65 to 40 mol percent 2,6-naphthalenedicarboxylic acid—together both being at least 90 mol percent—, and
   (B) an aromatic diol component comprising repeating units of at least 90 mol percent hydroquinone wherein the total mol percent of acid component and aromatic diol component are each 100 mol percent; said polyester being insoluble in pentafluorophenol and having a melting point below about 450° C.

2. The polyester of claim 1 wherein said acid component comprises repeating units of about 40 to 50 mol percent terephthalic acid, and about 60 to 50 mol percent 2,6-naphthalenedicarboxylic acid.

3. The polyester of claim 1 wherein said aromatic diol component comprises repeating units of about 100 mol percent hydroquinone.

4. The polyester of claim 1 wherein said acid component and said aromatic diol component are symmetrical.

5. The polyester of claim 1 wherein said acid component comprises an amount up to 10 mol percent of at least one other aromatic dicarboxylic acid.

6. The polyester of claim 5 wherein said dicarboxylic acid is selected from the group consisting of isophthalic acid, 4,4'-biphenyldicarboxylic acid, 1,5-naphthalenedicarboxylic acid, 2,6-naphthalenedicarboxylic acid, 2,7-naphthalenedicarboxylic acid, 4,4'-oxydibenzoic acid, and trans-4,4'-stilbene-dicarboxylic acid.

7. The polyester of claim 1 wherein said aromatic diol component comprises an amount up to 10 mol percent of at least one other aromatic diol.

8. The polyester according to claim 7 wherein said aromatic diol component contains up to 5 mole percent of at least one other aromatic diol.

9. The polyester according to claim 8 wherein said other aromatic diol is selected from the group consisting of: bisphenol A, 4,4'-dihydroxydiphenylsulfone, 2-methylhydroquinone, 2-chlorohydroquinone, 2-(phenylethyl)hydroquinone, 2-phenylhydroquinone, 2-cyclohexylhydroquinone, and 4,4'-biphenol.

10. A composition comprising:
    (i) about 5 to 95 wt. % of the polyester of claim 1, and
    (ii) about 95 to 5 wt. % of at least one property modifier.

11. The composition of claim 10 wherein component (i) is present in an amount of about 10 to about 90 weight percent, and component (ii) is present in an amount of about 90 to about 10 weight percent.

12. The composition of claim 10 wherein said property modifier is 6,6-nylon, nylon-6, a poly(ether-imide), a polyphenylene oxide, a polyphenylene oxide/polystyrene blend, a different polyester, a polyphenylene sulfide, a polyphenylene sulfide/sulfone blend, a poly(ester-carbonate), a polycarbonate, a polysulfone ether, a poly(ether-ketone), a phosphorus compound, a halogen compound, a halogen compound in combination with an antimony compound, talc, mica, a glass fiber, or a carbon fiber.

13. A molded plastic comprising the polyester of claim 1.

14. An extruded plastic comprising the polyester of claim 1.

15. A fiber comprising the polyester of claim 1.

16. A film comprising the polyester of claim 1.

17. The polyester of claim 1 wherein the melting point of the polyester is below about 400° C.

* * * * *